Patented Sept. 15, 1936

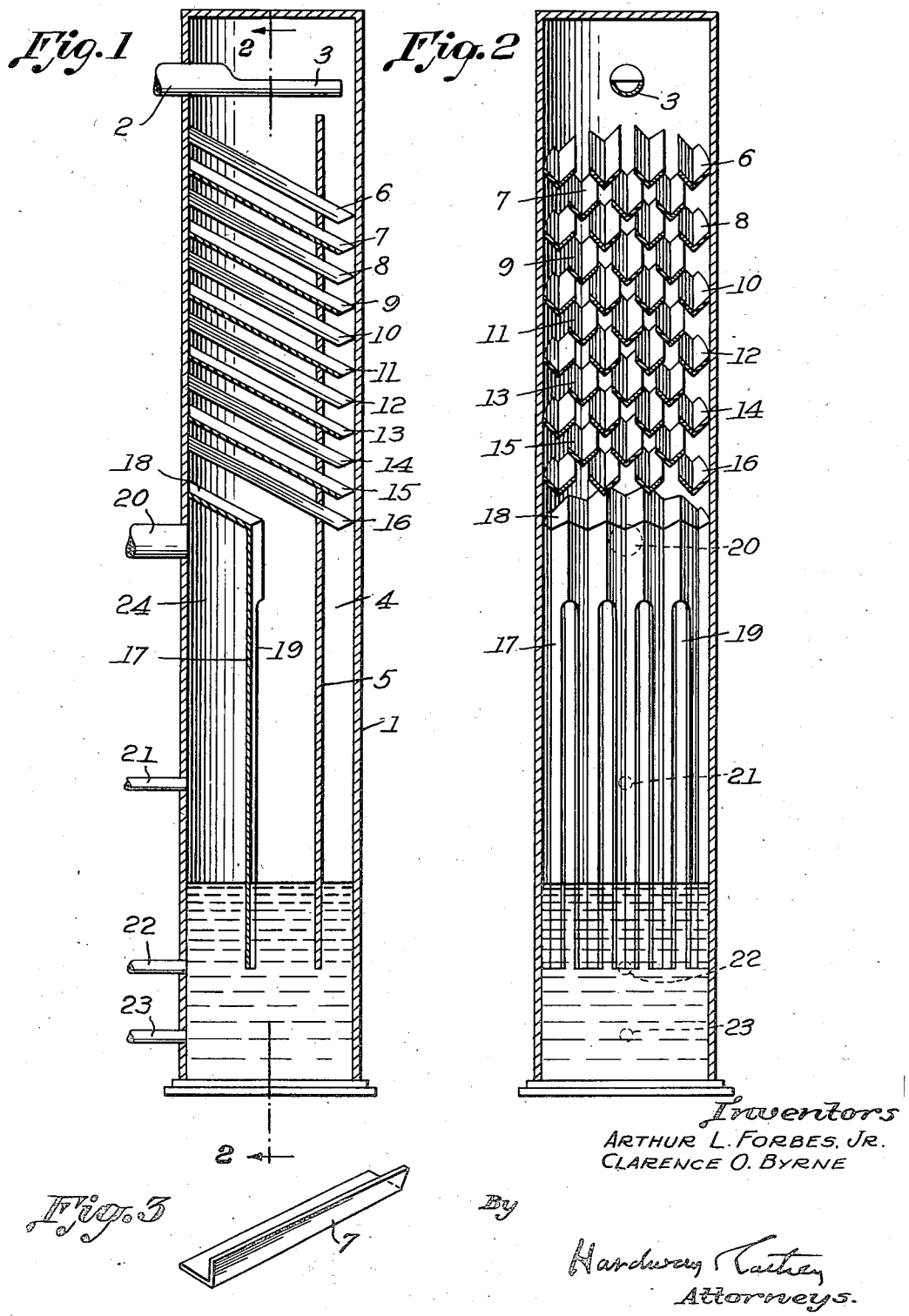

2,054,124

UNITED STATES PATENT OFFICE 2,054,124

SEPARATING TOWER

Arthur L. Forbes, Jr., and Clarence O. Byrne, El Paso, Tex.

Application February 12, 1935, Serial No. 6,186

2 Claims. (Cl. 183—2.7)

This invention relates to a separating tower.

An object of the invention is to provide a separating tower which has been especially provided for separating gases from liquids or liquids from gases, and has been more particularly designed for separating natural gas from oil.

Another object of the invention is to provide, in a separating tower, novel means for collecting oil entrained in natural gas, and thus separating the oil from the gas and for taking off the oil and gas separately from the tower.

With the above and other objects in view, the invention has particular relation to certain novel features of construction, operation, and arrangement of parts, an example of which is given in this specification and illustrated in the accompanying drawing, wherein:—

Fig. 1 shows a vertical sectional view of the apparatus.

Fig. 2 shows a vertical sectional view taken on the line 2—2 of Fig. 1, and

Fig. 3 shows a perspective view of a declining trough employed.

Referring now more particularly to the drawing wherein like numerals of reference designate the same parts in each of the figures, the numeral 1 designates the cylindrical shell of the tower. An inlet line 2 enters the upper portion of the shell and extends approximately across the shell, the extended portion 3 being trough-like in form. The discharge end of the trough-like portion 3 terminates above the vertical space 4. This space is formed by the provision of a transverse partition 5 in the shell which extends entirely across the shell and whose upper end is adjacent the trough 3 and whose lower end extends below the normal liquid level at the bottom of the shell.

Beneath the inwardly extended end of the inlet pipe 2 are the series of troughs, designated from above downwardly by the numerals 6 to 16 inclusive. The troughs of each series are arranged in staggered relation with respect to the troughs of the adjacent series. The upper ends of the troughs are shaped to fit closely against the adjacent wall of the shell and are secured thereto, and their lower ends project through the partition 5 into the vertical passageway 4, and are welded to the opposing wall of the shell with said lower ends beveled inwardly, as shown in Fig. 1, so that they will not be blocked or closed; the outer margins of the outer troughs of the series 6, 8, 10, 14, and 16 are welded to the walls of the shell.

Beneath the lower series of troughs, there is a partition wall 17 which spans the shell from side to side and whose upper end fits against and is securely attached to the same side of the wall of the shell as that to which the troughs 6 to 16 are attached. The upper portion of the partition wall 17 declines substantially parallel with the troughs above referred to, to approximately the vertical axial line of the shell and the remaining portion of the partition wall 17 extends approximately vertically to a point somewhat beneath the normal liquid level at the bottom of the tank. This partition wall 17 is vertically corrugated, thus providing the drainage troughs 18 for the oil, and the lower portion of the partition wall 17 has the vertical slots 19 extending from the lower end thereof up the desired distance.

Leading out from the shell beneath the upper end of the partition wall 17, there is an outlet pipe 20, and beneath this outlet pipe 20, are the pipes 21, 22, and 23, which form means for the connection of a conventional type of liquid level control apparatus which controls the outflow of the collected liquid through the pipe 23 in the well-known manner.

Gas in which oil is intermingled flows into the shell under pressure through the pipe 2 and under normal conditions the bulk of the oil will flow through the trough-like portion 3 of the inlet pipe 2 and down through the passageway 4 and collect at the bottom of the shell. Any overflow of oil from the trough-like portion 3 will fall down onto the troughs 6, and the overflow, if any, of oil from the one series of troughs will fall down on to the next series beneath and will be conducted into said passageway 4. The remaining gas and oil entrained therein will flow downwardly and strike the series of troughs in succession from above downwardly, the oil collecting in the troughs and the gas passing on downwardly between them, the oil draining off into the passageway 4 and passing thence downwardly and collecting at the bottom of the shell. The gas that passes through the series of troughs may still contain a certain amount of oil, and this gas will come into contact with the partition wall 17, the oil being deposited on said wall and draining down along the troughs 18 and collecting at the bottom of the shell, and the gas will pass through the slots 19 into the chamber 24 and thence out through the outlet pipe 20.

The liquid collected at the lower end of the shell will be automatically drawn off at intervals through the outlet pipe 23 which is controlled by the liquid level control apparatus above referred to.

The drawing and description disclose what is now considered to be a preferred form of the invention by way of illustration only, while the broad principle of the invention will be defined by the appended claims.

What we claim is:

1. A separating tower comprising a vertical shell, an inlet pipe entering the upper portion of the shell through which a mixture of oil and gas may enter the shell, the inner end of said inlet pipe extending across the shell and being formed into an open trough, a gas outlet pipe leading from the lower portion of the shell and an oil outlet pipe leading from the lower portion of the shell, said shell having a vertical partition at one side forming a vertical passageway, said trough terminating over the upper end of the passageway and said passageway leading downwardly through the shell, declining troughs arranged between the inlet pipe and the outlet pipes whose lower ends extend through the partition and terminate in the passageway, a partition wall beneath the said declining troughs and arranged across the path of the gas moving from the inlet pipe to the gas outlet pipe, said wall having spaced openings therethrough through which the gas may pass in its course toward the gas outlet pipe, said oil outlet pipe being arranged beneath the gas outlet pipe.

2. A separating tower comprising a vertical shell, an inlet pipe entering the upper portion of the shell through which a mixture of oil and gas may enter the shell, the inner end of said inlet pipe extending across the shell and having the upper portion of its sides cut away, a gas outlet pipe leading from the lower portion of the shell and an oil outlet pipe leading from the lower portion of the shell, said shell having a substantially vertical partition forming a vertical passageway, said inner end of the inlet pipe terminating over the upper end of the passageway and said passageway leading downwardly through the shell, declining troughs arranged between the inlet pipe and the outlet pipes whose lower ends extend through the partition and terminate in the passageway, a partition wall beneath the said declining troughs and arranged across the path of the gas moving from the inlet pipe to the gas outlet pipe, said wall having spaced openings therethrough through which the gas may pass in its course toward the gas outlet pipe, said oil outlet pipe being arranged beneath the gas outlet pipe.

ARTHUR L. FORBES, Jr.
CLARENCE O. BYRNE.